United States Patent [19]
Verrijp et al.

[11] Patent Number: 5,954,574
[45] Date of Patent: Sep. 21, 1999

[54] WING REMOVER

[76] Inventors: Bastiaan Verrijp, Burg de Zeeuwstraat 1034, 3281 AG, Numansdorp; Gerrit Barendregt, Thorbeckehof 5, 3274 CP, Heinenoold; Willem C. Steenbergen, Julianastraat 24, 3281 BK, Numansdorp, all of Netherlands

[21] Appl. No.: 08/909,653

[22] Filed: Aug. 12, 1997

[51] Int. Cl.⁶ .................................................. A22C 21/00
[52] U.S. Cl. ............................................................ 452/169
[58] Field of Search ...................... 452/169, 166

[56] References Cited

U.S. PATENT DOCUMENTS

| | | | |
|---|---|---|---|
| 4,562,613 | 1/1986 | Lewis | 452/169 |
| 4,651,383 | 3/1987 | van der Eerden | 452/169 |
| 4,827,570 | 5/1989 | Scheier et al. | 452/169 |
| 4,993,115 | 2/1991 | Hazenbroek | 452/169 |
| 5,188,560 | 2/1993 | Hazenbroek | 452/169 |
| 5,429,549 | 7/1995 | Verrijp et al. | 452/169 |

*Primary Examiner*—Willis Little
*Attorney, Agent, or Firm*—Thomas, Kayden, Horstemeyer & Risley

[57] ABSTRACT

A wing remover (10) for removing the wings from birds as the birds are conveyed along an overhead conveyor line (13) includes wing guides (66 and 67) that engage the birds and cause the shoulder joints between the wings and shoulders of the birds to be opened as the birds are moved towards a cutting station (29). As the birds enter the cutting station (29), they are engaged by a set of first cutting blades (80 and 81) that cut into the shoulder joints of the birds to initiate the separation of the wings therefrom. As the birds are carried further forwardly through the wing remover (10), the wings are urged rearwardly and downwardly as the shoulder joints are carried into engagement with and cut by second cutting blades (95 and 96) to complete the separation of the wings from the birds.

23 Claims, 5 Drawing Sheets

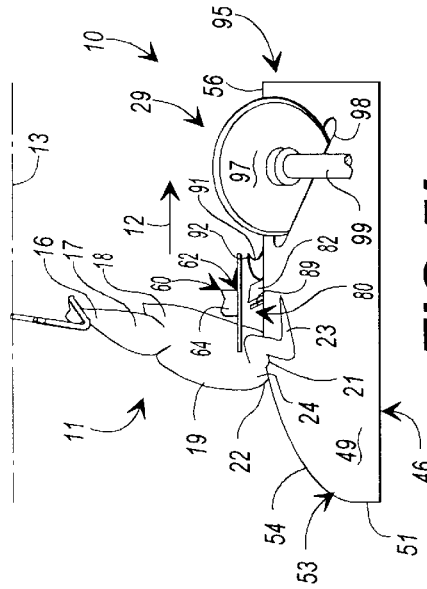
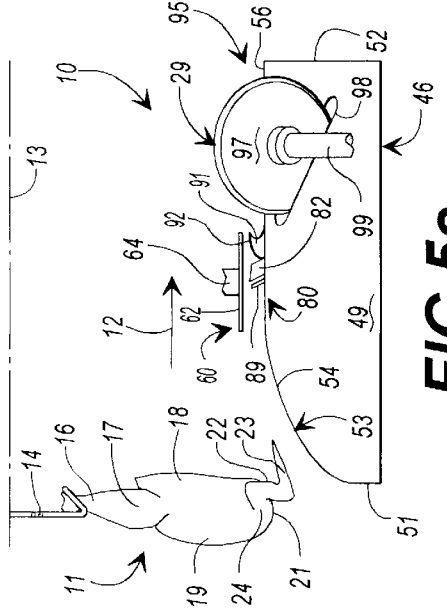
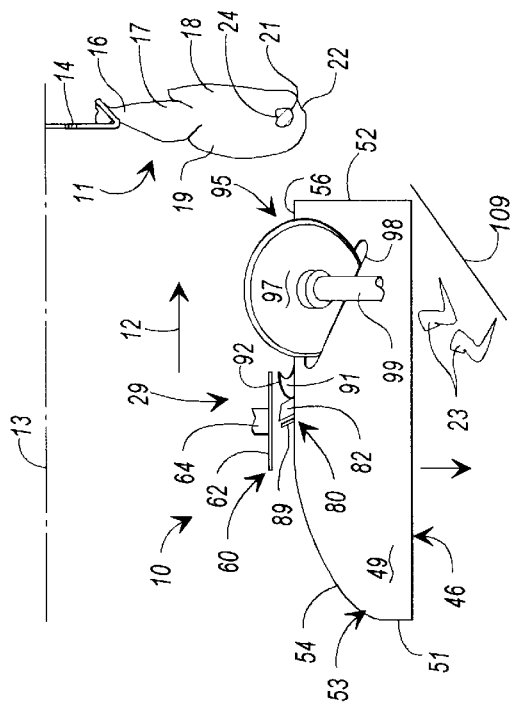
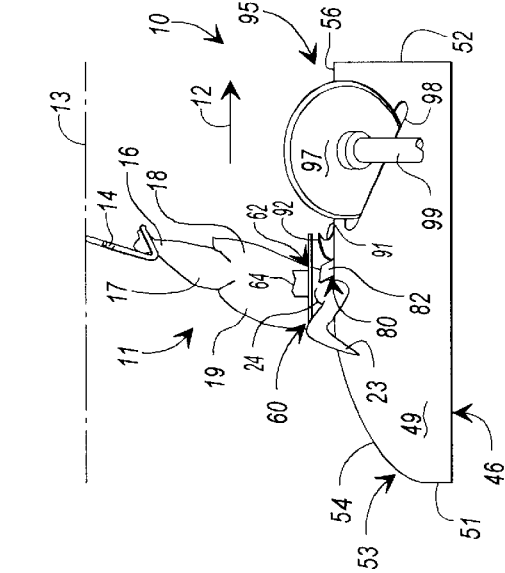

WING REMOVER

FIELD OF THE INVENTION

The present invention relates in general to a method and apparatus for removing the wings from birds. In particular, the present invention relates to a method and apparatus for removing the wings from previously eviscerated birds as the birds are conveyed along an overhead conveyor line wherein the wings are rolled towards the breasts of the birds as the wings are cut away so that the wings are removed with a maximum amount of meat from about the shoulder joints of the birds being retained with the breasts of the birds.

BACKGROUND OF THE INVENTION

In recent years, the processing of birds such as chickens, turkeys and other poultry has become highly automated, with the birds being suspended by their legs from overhead conveying systems and being conveyed along processing lines through a series of processing stations for evisceration, cut-up, and further processing. Such automated processing lines are much more efficient than the manual processing of birds such that it is highly desirable to perform as many as the processing steps on the birds as possible while the birds are suspended from their overhead conveying lines in order to minimize the handling and ensure greater uniformity and efficiency in the cutting up and processing of the birds. For example, birds now can be defeathered, decapitated, opened, eviscerated and cut apart while being advanced progressively through a poultry processing plant suspended from an overhead conveyor line. As a result, the labor required for processing of birds has been significantly reduced while uniformity and efficiency in the sectioning of the birds into various parts for packaging and sale has significantly increased.

A problem with early processing lines was the hazard of creating chips or other loose fragments of bone due to engagement of the bones with the cutting blades of such processing equipment. As a result, bone chips and fragments could become caught in the meat of the sectioned pieces of the birds that were packaged and shipped to the consumer, posing a significant health risk to the consumer. This has especially been a problem with the cutting of more delicate bones or portions of birds such as wings of birds. Accordingly, the removal of the wings of birds formerly was largely done by hand or by stand-alone wing removal machines. For example, U.S. Pat. Nos. 4,016,644, 4,503,587 and 4,536,919 disclose automated processing apparatus that apparently reduce the risk of bone fragments being dislodged by cutting blades during the removal of wings from the birds.

Such prior art wing removal apparatus generally exert a dragging force on the wings that cause the shoulder joints between the wings and breasts of the birds to partially open for passage of cutting blades therethrough with minimal contact between the cutting blades and the bones of the joint. The operation of these types of processing machines has reduced the risk of bone fragments being left in the meat of cut-up birds. However, most of the prior art devices have a tendency to pull meat away from the breast portions of the birds, and remove such meat with the less valuable wings.

U.S. Pat. No. 4,993,115 further discloses a compact wing cut-off machine for removing the wings from the carcasses of poultry or birds with a minimal amount of breast meat being removed therewith. However, such apparatus is not designed to work with an overhead conveying line. Rather, this device is a stand-alone machine that requires an operator to specifically position cut-apart sections of birds, including the breasts, upper backs and wings of the birds on a series of cradles for removal of the wings. In addition, such a wing removal apparatus is not designed to accommodate birds of varying sizes for removal of the wings therefrom.

Automated poultry wing removal apparatus have been developed for severing or cutting wings from birds while the birds are suspended from an overhead conveyor system, an example of which is disclosed in U.S. Pat. No. 5,429,549. This patent discloses a sequential wing remover that is mounted on a poultry processing line and engages the birds sequentially to remove the wings of the birds on one side of the breasts first and then to remove the wings on the opposite side of the breasts. This device, however, is designed to cut the wings of the birds away from their breasts with an additional amount of breast meat being pulled and cut away with the wings so as to give meatier wings, at the expense of the breasts of the birds. Such removal of breast meat with the wings today is not very desirable as the breasts of the birds are generally in higher demand, and are the more expensive parts of the carcass, while the wings are typically much less expensive and of less demand.

Accordingly, it can be seen that the need exists for an on-line wing remover than can be mounted along a poultry processing line, and which engages and progressively and cleanly removes the wings from the breasts and backs of the birds as the birds are carried in series along an overhead conveyor line with the danger of creating bone fragments or chips in the meat of the birds being minimized and which retains a maximum amount of meat on the breasts of the birds.

SUMMARY OF THE INVENTION

Briefly described, the present invention comprises a wing remover for removing the wings from the breasts and backs of previously eviscerated birds as the birds are moved along a processing path suspended by their legs from an overhead conveyor line with their backs leading and breasts trailing. As the birds enter the wing remover, the birds engage a pair of spaced parallel partitions that extend longitudinally, substantially parallel to the processing path of the birds. The partitions generally comprise vertically oriented, substantially rectangularly shaped plates formed from a metal such as stainless steel. Each partition includes an upwardly sloping proximal end, a distal end, and an inwardly projecting upper edge along which the shoulders of the birds move. The partitions act as a means for guiding the birds through the wing remover and maintain the necks and shoulders of the birds in a desired alignment as the wings are cut from the birds.

Wing guides are mounted adjacent the partitions, along and spaced from an outer facing surface of each partition. The wing guides generally include vertically oriented sprockets or guide wheels that include a series of radially projecting teeth about their circumference. Elongated guide plates are mounted above the guide wheels and extend parallel to the processing path through the wing cutter. The guide wheels are engaged by the shoulder joints of the birds as the birds are moved along the processing path, causing the shoulder joints to be urged upwardly and the wings to be urged downwardly and rearwardly to open the shoulder joints. Thereafter, as the wings are moved along the guide plates, wings are caused to roll toward the breasts of the birds to align and maintain the shoulder joints of the birds open for cutting.

A cutting station is positioned downstream from the wing guides, mounted along the partitions. The cutting station includes first cutting blades, which comprise stationary knives, each mounted along an inner facing surface of each partition. The knives engage and cut through the skin and leaders on the tops of the shoulder joints of the birds which connect the wings to the shoulders of the birds. Fenders are mounted to the upper edges of the partitions, positioned immediately adjacent and in abutment with the rear edges of the stationary cutting blades. The fenders flare outwardly from the partitions and the processing path of the birds toward the wing guides.

The wings of the birds are engaged between the fenders and guide plates of the wing guides as the stationary cutting blades cut through the leaders, etc. across the tops of the shoulders of the birds. As a result, the wings are caused to be rolled rearwardly toward the breasts of the birds, and the shoulder joints of the birds are further opened so that the bones of the wings tend to become oriented diagonally as the wings are urged towards the breasts of the birds. The bones thus are aligned for cutting by a set of second cutting blades of the cutting station.

The second cutting blades comprise outwardly sloping rotary disc cutting blades mounted on opposite sides of the processing path immediately downstream from the first cutting blades. The rotary disc cutting blades project through slotted openings formed in the partitions. The rotary disc cutting blades are further positioned at an angle with respect to the oncoming birds so as to be aligned approximately longitudinally with the wing bones of the wings of the birds after the wings have been rolled toward the breasts of the birds. The rotary disc cutting blades cut through the open shoulder joints and partially along the length of the wing bones to separate the wings from the breasts and backs of the birds with a maximum amount of meat from about the shoulder joints being retained with the breasts.

Thus, it is an object of the present invention to provide an improved method and apparatus for automatically removing the wings from birds.

Another object of the present invention is to provide an improved method and apparatus for cleanly and accurately removing the wings of birds as the birds are conveyed along a processing path suspended from an overhead conveyor line.

Another object of the present invention is to provide an improved apparatus and method of removing the wings from birds being conveyed in series suspended from an overhead conveyor line, which is adjustable to accommodate birds of varying sizes.

Still another object of the present invention is to provide an improved method and apparatus for automatically removing the wings of birds while retaining a maximum amount of meat from about the shoulder joints of the birds with the breasts of the birds, and with the hazard of engaging the bones of the birds and creating bone chips, etc. being minimized.

Still another object of the present invention is to provide an improved method and apparatus for removing the wings from birds as the birds are conveyed in series along a processing path, in which the wings of the birds are progressively rolled towards the breasts of the birds as part of a multi-step cutting operation so that the shoulder joints between the wings and shoulders of the birds are opened and the wing bones become aligned with a cutting means for cutting along the wing bones to separate the wings from the birds while retaining a maximum amount of meat from about the shoulder joints with the breasts of the birds.

Various other objects, features and advantages of the present invention will become apparent upon reading the following specification, when taken in conjunction with the accompanying drawings.

BRIEF DESCRIPTION OF THE DRAWINGS

FIGS. 5a–5d are side elevational views schematically illustrating the process by which the wings of the birds are engaged, cut, rolled towards the breasts of the birds, and removed by the wing remover.

DETAILED DESCRIPTION

Figure 1:
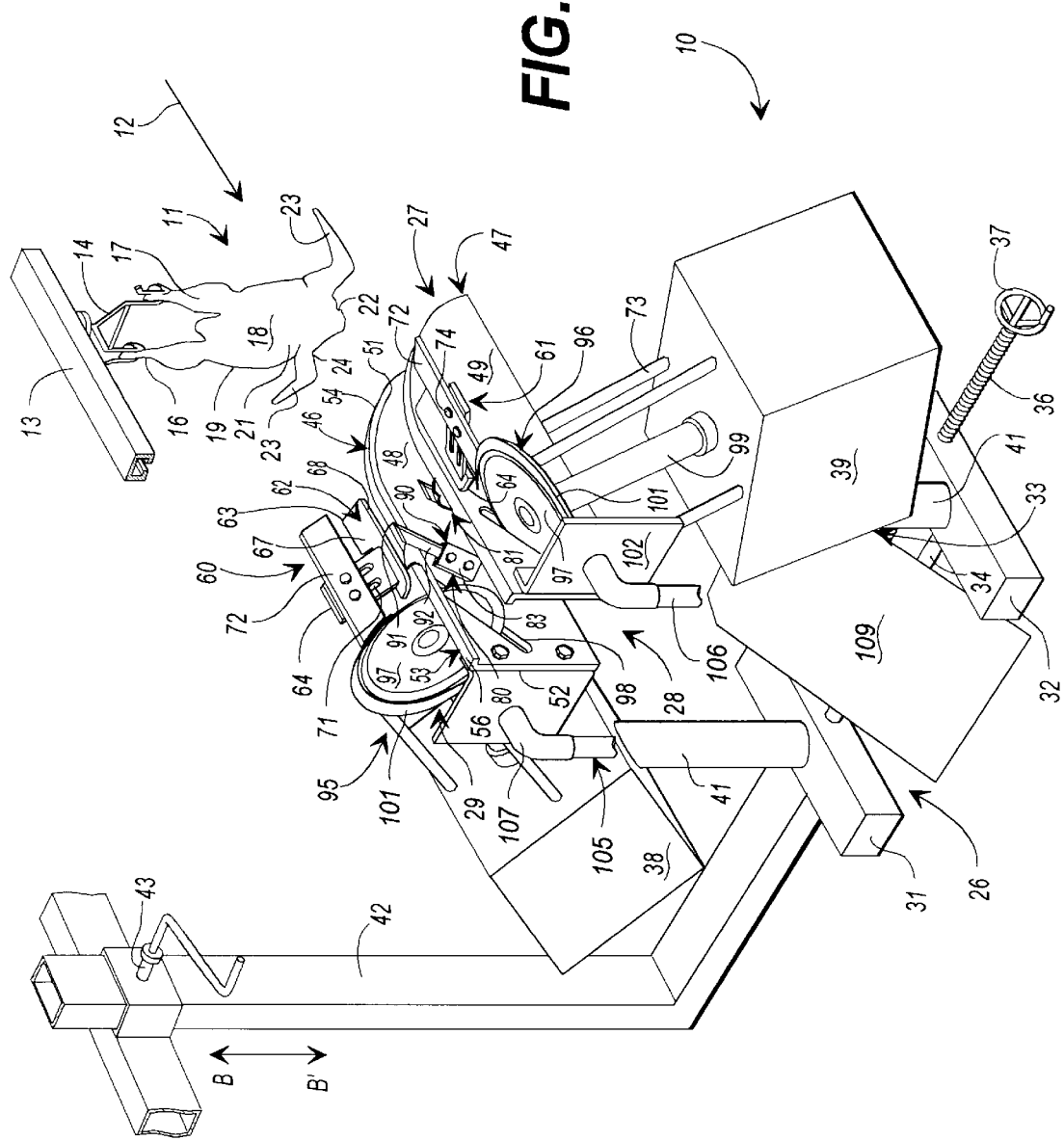
FIG. 1 is a perspective illustration of the wing remover mounted along a poultry processing line.

Referring now in greater detail to the drawings in which like numerals indicate like parts throughout the several views, FIG. 1 illustrates the wing remover 10 for removing the wings from birds 11 moving in spaced series along a processing path, indicated by arrows 12 suspended from an overhead conveyor line 13 on shackles 14. Each of the birds generally will have been previously eviscerated and processed for segmenting by a cut-up line. The birds each include legs 16 that are received and held within the shackles 14, thighs 17, back 18, breast 19, shoulders 21, neck 22, wings 23, and shoulder joints 24 between the wings and shoulders 21. The birds are suspended by their legs from the shackles 14 with their neck portions 22 hanging downwardly and are moved along their processing path 12 with their backs 18 leading and their breasts 19 trailing, and with the wings 23 of the birds spread and extending laterally outwardly from the birds.

As FIG. 1 illustrates, the wing remover 10 is mounted along the processing path of the birds and is positioned at an elevation sufficient to receive and engage the birds as the birds are moved along their processing path by the overhead conveyor line. The wing remover is adjustably mounted to the poultry cut-up line (not shown), and includes an adjustable framework 26 to enable the adjustment of the elements of the wing remover to accommodate birds of varying sizes. The wing remover 10 further has a proximal or inlet end 27 at which the birds are received and a distal or outlet end 28 from which the birds are discharged. A cutting area or station 29 in which the wings of the birds are cut from the breasts and backs of the birds is positioned adjacent the outlet end 28 of the wing remover.

Figure 2:
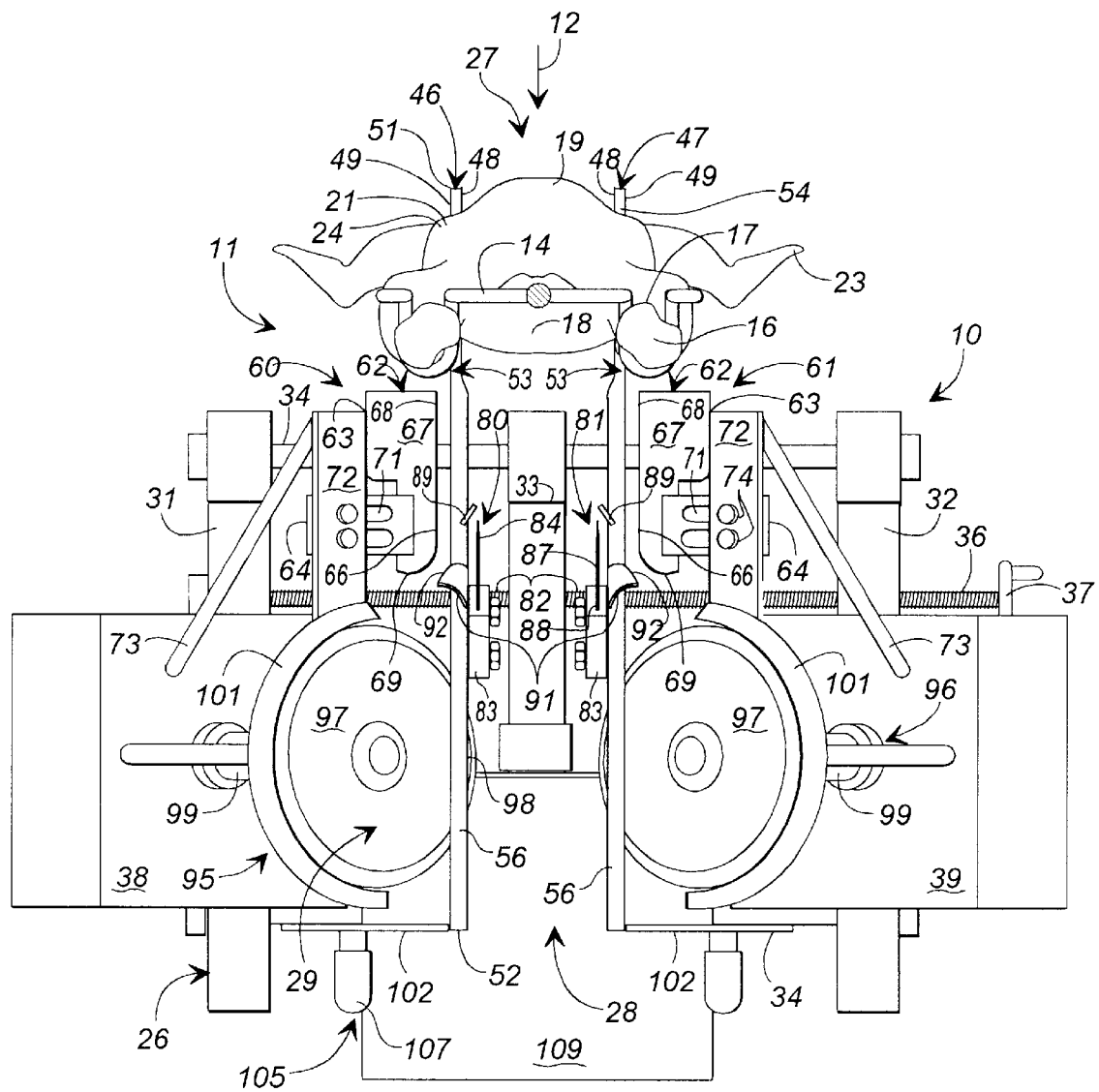
FIG. 2 is a plan view of the wing remover of FIG. 1.

As shown in FIGS. 1 and 2, the adjustable framework 26 of the wing remover 10 includes a series of support bars or beams 31, 32, and 33 (FIG. 2), with support beams 31 and 32 being movable in the direction of arrows A and A' laterally toward and away from the central support beam 33. The support beams are mounted on travel rods 34, and a travel screw 36 having a hand crank 37 which is rotated to cause the support beams 31 and 32 to be moved toward or away from the central support beam 33 as needed for the wing remover 10 to accommodate birds of varying sizes. The framework 26 further includes housings 38 and 39 mounted to the support beams 31 and 32 by upstanding bars or rods 41. The housings support the cutting and guiding elements of the wing remover 10. As FIG. 1 indicates, the frame 26 is mounted to a support 42 that attaches to the central support beam, and is mounted at its opposite end to the poultry cut-up line by an adjustable mount 43 for supporting the wing remover therealong, and which enables the wing remover to be adjusted vertically in the direction of Arrows B and B' with respect to the oncoming birds to accommodate birds of varying sizes.

Figure 3:
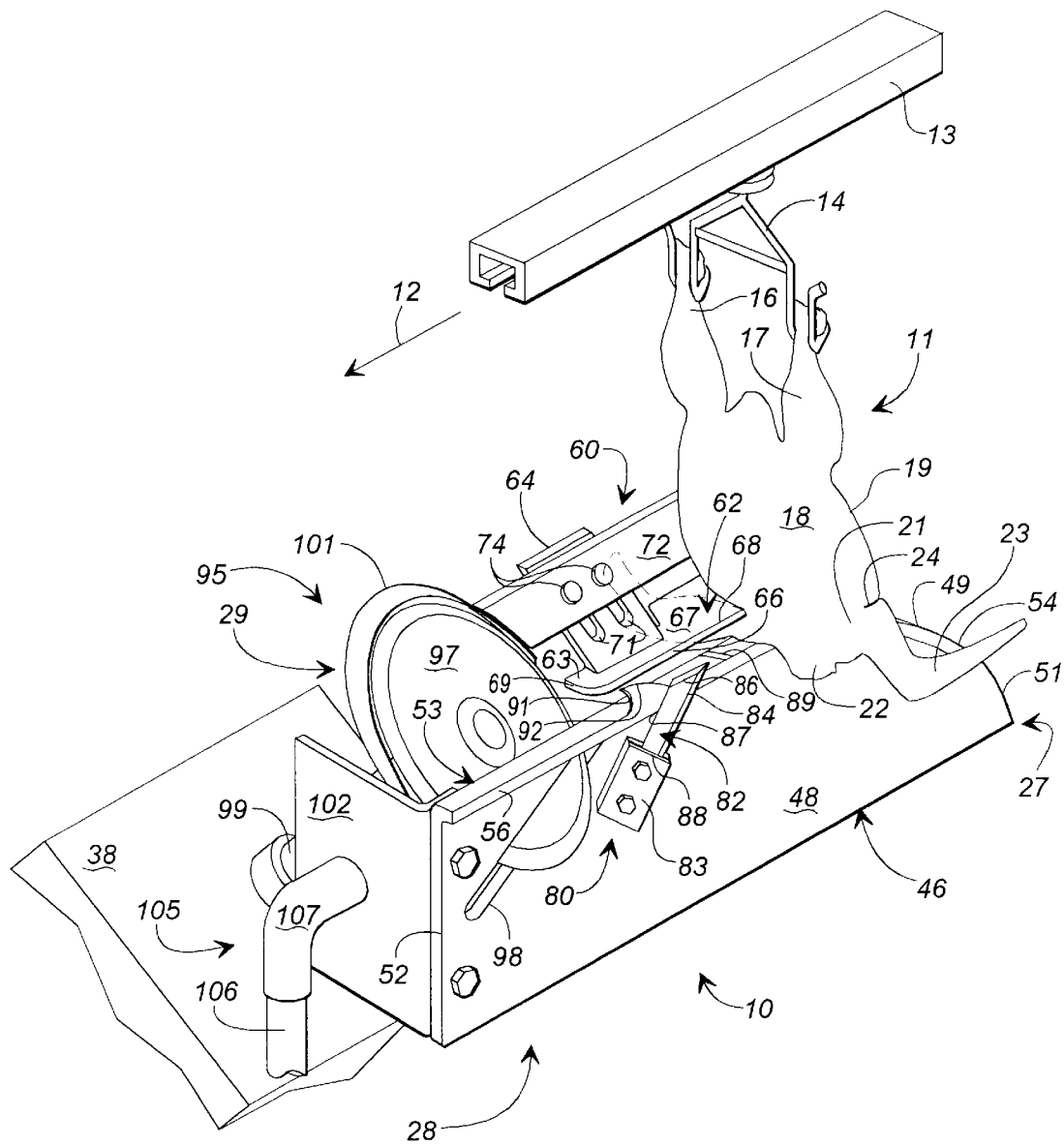
FIG. 3 is a perspective illustration of one side of the wing remover, illustrating the movement of a bird along a guide partition and the engagement of the wing of the bird by a wing guide, with parts being removed for clarity.

As shown in FIGS. 1 and 2, a pair of longitudinally extending partitions 46 and 47 extend from the inlet end 27 of the wing remover to its outlet end 28. The partitions 46 and 47 are oriented parallel to one another and extend through the wing remover on opposite sides of the processing path 12. As shown in FIG. 3, each partition is a trapezoidally shaped plate formed from a metal such as stainless steel and is oriented vertically. The partitions each include an inwardly facing surface 48, an outwardly facing surface 49, a proximal or first end 51, a distal or second end 52, and an upper edge 53. The upper edge 53 of each partition includes an upwardly sloping forward portion 54 and a horizontally oriented, inwardly projecting or flaring portion 56 that extends through the cutting station 29 of the wing remover 10.

Figure 4:
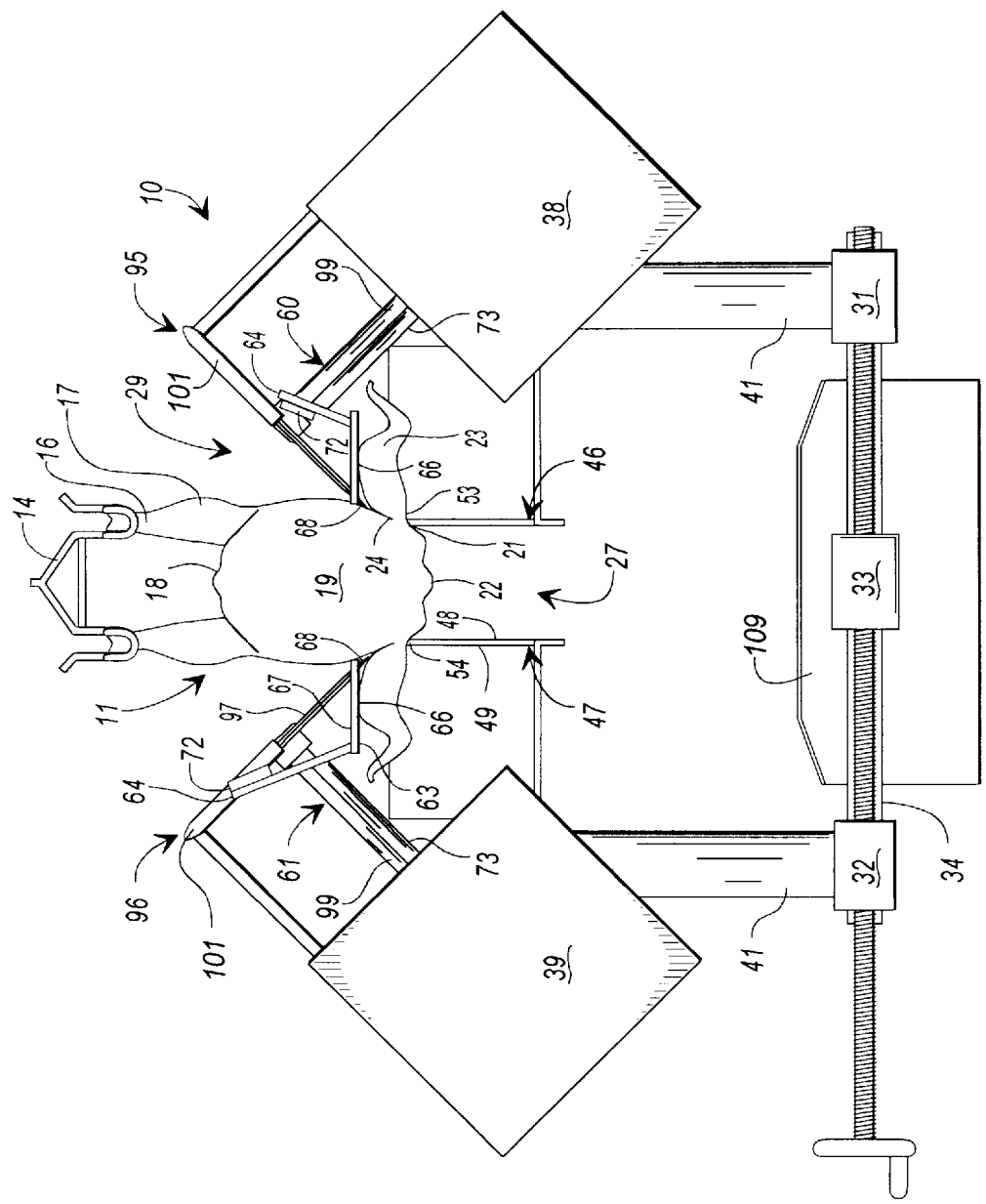
FIG. 4 is an end view of the wing remover illustrating the movement of a bird into the wing remover with the wings of the bird being engaged on each side by the wing guides.

As illustrated in FIGS. 1 and 4, a pair of lower guide rods 56 and 57 are mounted at the inlet end 27 of the wing remover 10. The lower guide rods 56 and 57 are elongated metal rods, and each include a downwardly sloping proximal or first end 58 that projects forwardly from the wing remover toward the oncoming birds, and an upwardly sloping distal or rearward portion 59 that extends toward the first ends 51 of the partitions. Upper guide rods 61 and 62 are positioned above and extend partially parallel to the lower guide rods 56 and 57 from in front of the wing remover along the processing path of the birds into the wing remover. The upper guide rods 61 and 62 include first portions 63 that engage and direct the birds toward the partitions to stabilize and prevent the birds from swinging, and substantially horizontally extending rear portions 64 that engage the underside portions of the wings as the birds move along the processing path.

As the birds enter the wing remover, the backs of the birds engage the lower guide rods 56 and 57 and the sides of the birds engage the upper guide rods 61 and 62. The engagement with the lower guide rods tends to tilt the birds while the upper and lower guide rods together direct the birds into the wing remover and help stabilize the birds as the birds enter the wing remover. Thereafter, the necks 22 of the birds are received between the partitions as the shoulders 21 of the birds engage and slide upwardly along the forward portions 54 of the partitions, which causes the birds to tilt slightly forwardly and the wings 23 to be guided upwardly as the birds are pulled into the wing remover.

Wing guides 66 and 67 (FIGS. 1, 2 and 4), are mounted on opposite sides of the processing path 12 along and adjacent the partitions 46 and 47. Each wing guide includes a vertically oriented guide wheel or sprocket 68 rotatably mounted adjacent the outwardly facing surface 49 of each partition. The guide wheels typically are formed from a material such as nylon or a similar durable plastic material and include a series of radially projecting teeth 69. As shown in FIG. 1, the guide wheels project slightly above the upper edges 53 of the partitions 46 and 47. The shoulders of the birds engage and ride over the guide wheels, causing the shoulders to be urged upwardly and the shoulder joints to open. The teeth of the guide wheels engage the birds at the shoulders 22 thereof as the birds pass over the guide wheels and prevent the birds from slipping and becoming misaligned prior to cutting.

The wing guides 66 and 67 further include elongated guide plates or bars 71, typically formed from a metal such as stainless steel. The guide plates 71 are mounted at one end 72 to support brackets 73 and extend substantially parallel to the partitions 46 and 47 on each side of the wing remover. The guide plates help guide and stabilize the birds and wings as they move through the cutting station 29. As shown in FIG. 1, the support brackets 73 are typically substantially L-shaped supports with connector sleeves 74 mounted at a lower end, to which the first ends 72 of the guide plates 71 and the rear portions 64 of the upper guide rods are mounted for support.

As shown in FIGS. 1 and 2, the cutting station 29 is positioned immediately downstream from the wing guides 66 and 67, mounted along and projecting through the partitions 46 and 47. The cutting station includes a set or pair of first cutting blades 80 and 81 positioned on opposite sides of the processing path 12 of the birds 11. The first cutting blades generally comprise stationary knives 82 mounted in knife brackets 83 that are attached to the inwardly facing surfaces 48 of the partitions 46 and 47. As shown in FIG. 3, the knives 82 each are oriented at an angle with respect to the oncoming birds and extend slightly above the upper edge 53 of their partition. The knives each include a forward or cutting edge 84, and upper edge 86, rear edge 87, and a lower end 88 that is received and secured within its knife bracket 83.

The knives are positioned within the path of the oncoming birds with their cutting edges 84 aligned with the shoulder joints 24 between the wings 23 and shoulders 21 of the oncoming birds 11. As the birds move through the wing remover with their shoulders sliding along the upper edges of the partitions and with their wings being engaged by the wing guides, the opened shoulder joints are carried into engagement with the first cutting blades which tend to cut through the skin and leaders, ligaments, etc., holding the wings to the shoulders of the birds. This cutting of the leaders, etc. and guiding of the wings causes the wings to be rolled back toward the breast of the bird to dislocate the wing ones from the shoulder joints.

As shown in FIG. 3, guide pins 89 are mounted to the upper edges 53 of the partitions, positioned in front of the knives 82. the guide pins 89 are formed from metal and project at an angle upwardly toward the cutting edges 84 of the knives 82. The pins 89 guide the tops of the shoulders 21 of the birds 11 toward the knives to ensure the shoulder joints 24 engage and are cut by the knives.

Guide fenders 91 are mounted to the upper edges 53 of the partitions 46 and 47 (FIGS. 1 and 2), attached to and extending outwardly from the rear edges 87 of the knives 82. The fenders typically are formed as part of the upper edges of the partitions and are generally triangularly shaped, including a guide edge or surface 92. The wings of the birds tend to engage the guide edges as the birds are moved over and are engaged by the first cutting blades so that as the first cutting blades cut through the leaders, ligaments, etc. holding the wings to the birds, so that the wings are rolled rearwardly toward the breasts of the birds to further open the shoulder joints and align the wing bones for completion of the removal of the wings from the birds.

The cutting station 29 further includes a set or pair of second cutting blades 95 and 96 mounted downstream from the first cutting blades 80 and 81. The second cutting blades each comprise rotary disc cutting blades 97 that are positioned at an angle with respect to the oncoming birds. The rotary disc cutting blades extend downwardly toward the processing path of the birds and are received through slots 98 formed in the partitions 46 and 47 as shown in FIG. 3. The rotary disc cutting blades 97 are mounted on drive shafts 99 (FIG. 1) that are connected to drive motors (not shown) contained within the housings 38 and 39. The rotary disc cutting blades further are oriented diagonally with respect to the processing path of the birds so as to cut through the opened shoulder joints partially along the length of the wing bones with the wings in their rolled back position adjacent the breasts of the birds. The rotary disc cutting blades complete the separation of the wings with a maximum amount of meat remaining with the breasts of the birds, instead of being cut away from the breasts with the wings.

A guard 101 is mounted about the upper edge of each rotary disc cutting blade 97 and attaches at one end to a guide plate 71 of each wing guide 66 and 67 to provide further support for the guide plates. The guards attach at their opposite ends to a rectangular frame plate 102 mounted to the distal end 52 of each partition 46 or 47. The guards 101 prevent inadvertent contact by workers with the rotary disc cutting blades to prevent injury, etc.

As illustrated in FIG. 1, fluid lines 105 are connected to each of the frame plates 102 mounted to the distal ends 52 of the partitions 46 and 47. The fluid lines include flexible conduits 106 that are connected at one end to a fluid supply for supplying water to the wing remover, and are connected at their opposite end to an elbow connector 107 mounted to each frame plate 102. The fluid lines supply a flow of water that is directed against the cutting blades to wash away any collected debris such as skin, etc. for sanitary purposes.

A slide 109 is mounted beneath the cutting station 29 of the wing remover 10. The slide generally is made from metal such as stainless steel and slopes downwardly away from the wing remover. As the wings are cut from the birds, as illustrated in FIG. 5, the wings fall downwardly through the wing remover onto the slide which directs the wings toward a collection means such as a bin or transfer conveyor (not shown) for collection and further processing.

Operation

In the operation of the wing remover 10 (FIG. 1) the birds are carried along their processing path 12 by the overhead conveyor line into engagement with the wing remover with the backs 18 of the birds 11 leading, their breasts 19 trailing and with their wings 23 extending outwardly. As the birds enter the wing remover 10, as shown in FIG. 1, the backs of the birds engage the lower guide rods 56 and 57 and the sides of the birds engage the upper guide rods 61 and 62. The guide rods stabilize and prevent the birds from swinging and direct the shoulders and backs of the birds toward the partitions and along the processing path through the wing remover. As illustrated in FIG. 5, the shoulders 21 of the birds 11 tend to engage the sloped forward portions 54 of the upper edges 53 of the partitions 46 and 47 with the necks 23 of the birds being received within the partitions. As a result, the birds tend to tilt forwardly as the birds slide upwardly along the forward portions of the partitions. This causes the birds to be properly positioned for cutting regardless of small variations in size of the birds.

As the birds are pulled along the partitions, the wings of the birds are engaged by and ride over the toothed sprockets 68 of the wing guides 66 and 67 (FIG. 1), the teeth 69 of which engage and hold the birds in a desired alignment for cutting and prevent the birds from slipping or twisting. The engagement of the shoulders of the birds by the guide wheels tends to urge the shoulders upwardly and cause the wings to move downwardly. This accordingly opens the shoulder joints for cutting.

The opened shoulder joints of the birds thereafter are carried into engagement with first cutting blades 80 and 81. The first cutting blades cut through the skin, leaders, ligaments, etc. that extend across the tops of the shoulder joints to connect the wings to the shoulders of the birds as the birds are pulled through the wing remover by their overhead conveyor line. The first cutting blades thus start the separation of the wings from the breasts and backs of the birds. As the birds are pulled further forwardly over the first cutting blades, the wings engage the guide fenders 91. The guide fenders act with the guide plates of the wing guides to urge the wings further downwardly and rearwardly, causing the wings to roll toward the breasts of the birds. As a result, the wing bones become dislocated from the shoulder joints and become diagonally oriented.

As shown in FIG. 5, after the wings have initially been cut by the first cutting blades, the birds are carried into engagement with the second cutting blades 95 and 96 (FIG. 2). The second cutting blades are oriented so as to cut through the opened shoulder joints and cut partially along the length of the wing bones. The second cutting blades complete the separation of the wings from the shoulders of the birds while leaving a maximum amount of breast meat remaining from about the shoulder joints for remaining with the breasts of the birds so as to further increase the size and weight of the more valuable breast meat of the birds. Thereafter, the separated wings drop down through the wing remover onto the slide 109 and are directed into a collection means for collection or further processing while the birds are carried further forwardly along their processing path through additional cutting and processing stations.

It will be understood by those skilled in the art that the present invention can be adapted for use in processing all types of poultry or foul including turkeys, chickens and other birds. It further will be understood by those skilled in the art that while the invention has been disclosed with reference to a preferred embodiment, various modifications, additions and deletions can be made thereto without departing from the spirit and scope of the invention as set forth in the following claims.

We claim:

1. A method of removing the wings of birds with the amount of the meat of the birds removed with the wings being minimized, comprising the steps of:

advancing the birds along a processing path in series toward a cutting station;

as the birds move through the cutting station, urging the shoulders of the birds upwardly and the wings of the birds downwardly, then engaging the birds with a first cutting means and cutting the birds between the wings and breasts and backs thereof;

as the birds engage the first cutting means, moving the wings toward the breasts of the birds to open the joints between the wings and breasts and backs of the birds to open the joints; and cutting through the opened joints with a second cutting means that cuts adjacent and partially along the bones of the wings to separate the wings from the breasts and backs of the birds with a minimal amount of meat of the breast and backs being removed with the wings.

2. The method of claim 1, wherein the birds are suspended from their hocks as the birds move through the cutting station, and wherein the step of moving the wings toward the breasts comprises engaging the wings with a guide means adjacent the first cutting means, and guiding the wings toward the breasts of the birds to open the joints for cutting with the first cutting means.

3. The method of claim 1, wherein the birds are moved back first along the processing path, and further including the step of guiding the necks and shoulders of the birds through the cutting station.

4. The method of claim 3 and wherein the step of guiding the necks and shoulders of the birds comprises engaging the necks and shoulders with an elongated guide rail with the necks and shoulders moving therealong as the birds are moved through the cutting station to maintain the birds in a tilted alignment for cutting such that the back of the bird is positioned below its breast during cutting.

5. The method of claim 1 and wherein the step of moving the wings toward the breasts comprises rolling the wings toward the breasts as the first cutting means cuts through the joints, opening the joints, and urging the bones of the wings away from the birds so that the opened joints become aligned with the second cutting means.

6. Apparatus for removing the wings from the breasts and backs of previously eviscerated whole birds with a significant amount of meat from about the shoulder joints between the wings and shoulders of the birds being retained with the breasts, comprising:

means for guiding the birds through the apparatus, positioned and extending along the processing path and adapted to engage the shoulders of the birds and position the birds for cutting;

wing guides mounted along said means for guiding in a position for engaging the wings of the birds for urging the shoulders of the birds upwardly and the wings downwardly to open and align the shoulder joints between the wings and shoulders of the birds for cutting;

a cutting station positioned along the processing path downstream from said wing guides for cutting through the shoulder joints between the wings and shoulders of the birds to separate the wings therefrom, and including cutting means oriented to cut through the shoulder joints adjacent and partially along the wings to remove the wings from the birds with a significant amount of meat retained with the breasts of the birds; and a guide fender mounted adjacent said cutting station for engaging and guiding the wings toward the breasts as the wings are cut from the birds.

7. The apparatus of claim 6 and wherein said cutting station includes a pair of first cutting blades positioned adjacent said wing guides along said guide means for cutting the birds at the shoulder joints thereof to initiate the removal of the wings, and a pair of second cutting blades downstream from said first cutting blades and positioned to cut through the shoulder joints for completing the removal of the wings from the birds.

8. The apparatus of claim 6 and wherein said wing guides include guide wheels rotatably mounted on opposite sides of the processing path and having a series of radially projecting teeth adapted to be engaged by the wings of the birds as the birds are moved through the apparatus.

9. The apparatus of claim 6 and wherein said means for guiding the birds comprises elongated, spaced partitions that extend along the processing path through said cutting station, and along which the birds are moved and supported for cutting.

10. Apparatus for removing the wings from the breasts and backs of previously eviscerated whole birds with a significant amount of meat from about the shoulder joints between the wings and shoulders of the birds being retained with the breasts, comprising:

means for guiding the birds through the apparatus, positioned and extending along the processing path and adapted to engage the shoulders of the birds and position the birds for cutting, said means for guiding the birds comprising elongated, spaced partitions that extend along the processing path through said cutting station, and along which the birds are moved and supported for cutting;

wing guides mounted along said means for guiding in a position for engaging the wings of the birds for urging the shoulders of the birds upwardly and the wings downwardly to open and align the shoulder joints between the wings and shoulders of the birds for cutting;

a cutting station positioned along the processing path downstream from said wing guides for cutting through the shoulder joints between the wings and shoulders of the birds to separate the wings therefrom, and including cutting means oriented to cut through the shoulder joints adjacent and partially along the wings to remove the wings from the birds with a significant amount of meat retained with the breasts of the birds; and a guide fender mounted along each partition adjacent said cutting station for engaging and guiding the wings toward the breasts as the wings are cut from the birds.

11. An apparatus for removing the wings from birds with a substantial amount of meat from about the shoulders and shoulder joints of the birds being retained with the breasts of the birds as the birds are moved along a processing path, comprising:

a pair of spaced partitions positioned on opposite sides of the processing path and each having a first end, a second end, and an upper edge adapted to be engaged by and along which the shoulders of the birds move;

wing guides mounted adjacent said partitions in a position to engage the shoulders of the birds as the birds are moved along the partitions for urging the shoulders upwardly and the wings downwardly toward the breasts of the birds to open the shoulder joints;

a first cutting means mounted along said upper edge of each partition for initially cutting the birds to initiate the separation of the wings and cause the shoulder joints to further open and the wings to be further urged toward the breasts of the birds; and second cutting means mounted downstream from said first cutting means adjacent said second ends of said partitions and oriented for cutting through the opened shoulder joints and partially along the wings of the birds to complete the separation of the wings from the birds with a maximum amount of meat from about the shoulders of the birds being retained with the breasts of the birds.

12. The apparatus of claim 11 wherein said wing guides include guide wheels rotatably mounted on opposite sides of the processing path in a position to engage the birds and urge the shoulders of the birds upwardly as the wings are urged toward the breasts of the birds to open the shoulder joints for cutting.

13. An apparatus for removing the wings from birds with a substantial amount of meat from about the shoulders and shoulder joints of the birds being retained with the breasts of the birds as the birds are moved along a processing path, comprising:

a pair of spaced partitions positioned on opposite sides of the processing path and each having a first end, a second end, and an upper edge adapted to be engaged by and along which the shoulders of the birds move;

wing guides mounted adjacent said partitions in a position to engage the shoulders of the birds as the birds are moved along the partitions for urging the shoulders upwardly and the wings toward the breasts of the birds to open the shoulder joints;

a first cutting means mounted along said upper edge of each partition for initially cutting the birds to initiate the separation of the wings and cause the shoulder joints to further open and the wings to be further urged toward the breasts of the birds;

second cutting means mounted downstream from said first cutting means adjacent said second ends of said partitions and oriented for cutting through the opened shoulder joints and partially along the wings of the birds to complete the separation of the wings from the birds with a maximum amount of meat from about the shoulders of the birds being retained with the breasts of the birds; and a guide fender mounted along each partition adjacent said first and second cutting means for engaging and guiding the wings outwardly as the birds are engaged by said second cutting means.

14. The apparatus of claim 11 and wherein said first cutting means comprises stationary knives mounted along said upper edges of said partitions in a position to engage and cut into the shoulders of the birds.

15. The apparatus of claim 11 and wherein said second cutting means comprises rotary disc cutting blades that extend partially through said partitions and are each oriented at an angle so as to be approximately aligned with the wings of the birds for cutting through the shoulder joints and partially along the wings.

16. An apparatus for removing wings from bird carcasses moving in series suspended by their legs form an overhead conveyor line with their backs leading their breasts, comprising:

a longitudinal guide member positioned to receive and guide said birds along a processing path;

a first guide sprocket mounted adjacent to a first side of said guide member and a second guide sprocket mounted adjacent to a second side of said guide member, wherein said first and second guide sprockets are for engaging and urging the wings of said birds away from said carcasses;

a pre-cutting means mounted collinear with said guide member and adjacent to said first and second guide sprockets for causing a preliminary incision in a skin of said bird between each of said wings and said carcasses;

a first cutting means positioned downstream from said pre-cutting means and along said first side of said guide member, and a second cutting means positioned downstream from said pre-cutting means and along said second side of said guide member, wherein said first and second cutting means are for detaching said wings from said bird carcasses; and a back supporting means attached above said first and second cutting means substantially coplanar to said guide member for forcing said bird carcasses up and away from said first and second cutting means as said wings are separated from the carcasses.

17. An apparatus for removing wings from bird carcasses moving in series suspended by their legs form an overhead conveyor line with their backs leading their breasts, comprising:

a longitudinal guide member positioned to receive and guide said birds along a processing path;

a first guide sprocket mounted adjacent to a first side of said guide member and a second guide sprocket mounted adjacent to a second side of said guide member, wherein said first and second guide sprockets are for engaging and urging the wings of said birds away from said carcasses;

a pre-cutting means mounted collinear with said guide member and adjacent to said first and second guide sprockets for causing a preliminary incision in a skin of said bird between each of said wings and said carcasses;

a first cutting means positioned downstream from said pre-cutting means and along said first side of said guide member, and a second cutting means positioned downstream from said pre-cutting means and along said second side of said guide member, wherein said first and second cutting means are for detaching said wings from said bird carcasses;

said first and second cutting means each comprising a circular blade rotating counter to a movement of said bird carcasses along said processing path.

18. An apparatus for removing wings from bird carcasses moving in series suspended by their legs form an overhead conveyor line with their backs leading their breasts, comprising:

a longitudinal guide member positioned to receive and guide said birds along a processing path;

a first guide sprocket mounted adjacent to a first side of said guide member and a second guide sprocket mounted adjacent to a second side of said guide member, wherein said first and second guide sprockets are for engaging and urging the wings of said birds away from said carcasses;

a pre-cutting means mounted collinear with said guide member and adjacent to said first and second guide sprockets for causing a preliminary incision in a skin of said bird between each of said wings and said carcasses;

a first cutting means positioned downstream from said pre-cutting means and along said first side of said guide member, and a second cutting means positioned downstream from said pre-cutting means and along said second side of said guide member, wherein said first and second cutting means are for detaching said wings from said bird carcasses; and a pair of substantially parallel wing guide rods extending along said processing path for engaging said wings and spreading them away from said carcasses.

19. An apparatus for removing wings from bird carcasses moving in series suspended by their legs form an overhead conveyor line with their backs leading their breasts, comprising:

a longitudinal guide member positioned to receive and guide said birds along a processing path;

a first guide sprocket mounted adjacent to a first side of said guide member and a second guide sprocket mounted adjacent to a second side of said guide member, said first and second guide sprockets each formed of a nylon wheel having cogs sized to receive said wings of said bird carcasses and rotating at a speed substantially the same as the speed of travel of said bird carcasses along said processing path, wherein said first and second guide sprockets are for engaging and urging the wings of said birds away from said carcasses;

a pre-cutting means mounted collinear with said guide member and adjacent to said first and second guide sprockets for causing a preliminary incision in a skin of said bird between each of said wings and said carcasses;

a first cutting means positioned downstream from said pre-cutting means and along said first side of said guide member, and a second cutting means positioned downstream from said pre-cutting means and along said second side of said guide member, wherein said first and second cutting means are for detaching said wings from said bird carcasses.

20. An apparatus for removing wings from bird carcasses moving in series suspended by their legs form an overhead conveyor line with their backs leading their breasts, comprising:

a longitudinal guide member positioned to receive and guide said birds along a processing path;

a first guide sprocket mounted adjacent to a first side of said guide member and a second guide sprocket mounted adjacent to a second side of said guide member, wherein said first and second guide sprockets are for engaging and urging the wings of said birds away from said carcasses;

a pre-cutting means mounted collinear with said guide member and adjacent to said first and second guide sprockets for causing a preliminary incision in a skin of said bird between each of said wings and said carcasses;

a first cutting means positioned downstream from said pre-cutting means and along said first side of said guide member, and a second cutting means positioned downstream from said pre-cutting means and along said second side of said guide member, wherein said first and second cutting means are for detaching said wings from said bird carcasses; and an adjustable framework on which said first and second guide sprockets, said first and second pre-cutting means, and said first and second cutting means are mounted, said framework enabling adjustment of said guide sprockets, said pre-cutting means, and said cutting means to accommodate various sizes and types of birds.

21. An apparatus for removing wings from bird carcasses moving in series suspended by their legs form an overhead conveyor line with their backs leading their breasts, comprising:

a longitudinal guide member positioned to receive and guide said birds along a processing path, said longitudinal guide member having a pair of elongated parallel plates, each of said plates having straight lower edges and upwardly sloping upper edges forming a neck receiving channel;

a first guide sprocket mounted adjacent to a first side of said guide member and a second guide sprocket mounted adjacent to a second side of said guide member, wherein said first and second guide sprockets are for engaging and urging the wings of said birds away from said carcasses;

a pre-cutting means mounted collinear with said guide member and adjacent to said first and second guide sprockets for causing a preliminary incision in a skin of said bird between each of said wings and said carcasses;

a first cutting means positioned downstream from said pre-cutting means and along said first side of said guide member, and a second cutting means positioned downstream from said pre-cutting means and along said second side of said guide member, wherein said first and second cutting means are for detaching said wings from said bird carcasses.

22. The apparatus of claim 21, wherein said upwardly sloping edges of said parallel plates are sharpened to form said pre-cutting means.

23. A method of automatically removing the wings of a bird from the carcass of the bird as the bird is suspended by its hocks and moved along a processing path comprising the steps of:

moving the bird back first along the processing path;

tilting the bird so that its back is positioned below its breast;

spreading the wings away from the carcass with guide bars extending along the processing path;

forming with a first cutting means a cut at the wing and carcass joint of each wing as the wings are spread away from the carcass of the bird;

engaging the wings of the bird with wheel means at opposite sides of the processing path and rotating the wheels moving in directions that tend to further spread the wings away from the carcass of the bird and open the cuts at the joints;

as the wheels engage and further spread the wings from the carcass, rolling the wings toward the breast of the bird to further open the shoulder joints of the bird; and cutting through the shoulder joints to remove the wings from the carcass.

\* \* \* \* \*